(12) United States Patent
Takase et al.

(10) Patent No.: US 10,287,942 B2
(45) Date of Patent: May 14, 2019

(54) HONEYCOMB TYPE HEATING DEVICE AND METHOD FOR USING THE SAME

(71) Applicant: NGK INSULATORS, LTD., Nagoya (JP)

(72) Inventors: Naoya Takase, Nagoya (JP); Yoshiyuki Kasai, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 104 days.

(21) Appl. No.: 15/655,976

(22) Filed: Jul. 21, 2017

(65) Prior Publication Data

US 2017/0321585 A1 Nov. 9, 2017

Related U.S. Application Data

(63) Continuation of application No. PCT/JP2016/077819, filed on Sep. 21, 2016.

(30) Foreign Application Priority Data

Nov. 16, 2015 (JP) .................................. 2015-224132

(51) Int. Cl.
*F01N 3/20* (2006.01)
*F01N 3/28* (2006.01)
*F01N 3/24* (2006.01)

(52) U.S. Cl.
CPC ............. *F01N 3/2013* (2013.01); *F01N 3/24* (2013.01); *F01N 3/2842* (2013.01);
(Continued)

(58) Field of Classification Search
CPC ........ F01N 3/2013; F01N 3/24; F01N 3/2842; F01N 2240/16; F01N 2350/04; Y02T 10/26
See application file for complete search history.

(56) References Cited

U.S. PATENT DOCUMENTS 5,259,190 A 11/1993 Bagley et al.
2011/0305601 A1 12/2011 Kawase et al.
(Continued)

FOREIGN PATENT DOCUMENTS

JP 2010-229976 A1 10/2010
JP 2011-256816 A1 12/2011
(Continued)

OTHER PUBLICATIONS

International Search Report and Written Opinion (Application No. PCT/JP2016/077819) dated Nov. 22, 2016.

*Primary Examiner* — Brandon D Lee
(74) *Attorney, Agent, or Firm* — Burr & Brown, PLLC

(57) ABSTRACT

A honeycomb type heating device includes a pillar-shaped honeycomb substrate having a partition wall defining and forming a plurality of cells and a circumferential wall surrounding the partition wall; a plurality of heaters adjacent to each other arranged on a circumferential surface of a circumferential wall in the circumferential direction of the circumferential surface; a connecting body arranged in the circumferential direction of the circumferential surface and electrically connecting the plurality of heaters; and a metal case housing the honeycomb substrate, the plurality of heaters, and the connecting body. Each heater is a resistance-heating type heater, the cross-sectional area of the connecting body in a cross section perpendicular to the circumferential direction of the circumferential surface is 10.0 to 30.0 mm², and the thermal expansion coefficient of the connecting body is higher than the thermal expansion coefficient of the honeycomb substrate by $3.0 \times 10^{-6}$/° C. or more.

18 Claims, 3 Drawing Sheets

(52) U.S. Cl.
CPC ...... *F01N 2240/16* (2013.01); *F01N 2350/04* (2013.01); *Y02T 10/26* (2013.01)

(56) References Cited

U.S. PATENT DOCUMENTS

2013/0224080 A1   8/2013   Ishihara et al.
2014/0301908 A1   10/2014  Takagaki et al.

FOREIGN PATENT DOCUMENTS

| JP | 2013-198887 A1 | 10/2013 |
| JP | 2013-238116 A1 | 11/2013 |
| WO | 2013/098889 A1 | 7/2013 |

US 10,287,942 B2

HONEYCOMB TYPE HEATING DEVICE AND METHOD FOR USING THE SAME

TECHNICAL FIELD

The present invention relates to a honeycomb type heating device that is installed in an exhaust path of exhaust gas discharged from an engine of an automobile or the like and that quickly raises the temperature of a catalyst for purifying exhaust gas to its activation temperature and a method for using the same.

BACKGROUND ART

Conventionally, a honeycomb structure loaded with a catalyst is used for purifying harmful substances such as HC, CO and NOx contained in exhaust gas discharged from an engine of an automobile or the like. Thus, in the case of treating the exhaust gas with the catalyst loaded onto the honeycomb structure, the temperature of the catalyst needs to be raised to its activation temperature; however, since the catalyst has not reached the activation temperature at the time of starting the engine, there is a problem that the exhaust gas is not sufficiently purified. In particular, since plug-in hybrid vehicles (PHEV) and hybrid vehicles (HV) include running only with motors for their traveling, the engine starting frequency is low and the catalyst temperature at the time of starting the engine is low, and therefore, the performance for purifying exhaust gas tends to deteriorate.

In order to solve this problem, there has been proposed an electrically heated catalyst (EHC) in which electrodes are disposed in a honeycomb structure made of conductive ceramics, and the honeycomb structure itself is caused to generate heat by energization, whereby the catalyst can be heated to the activation temperature before starting the engine (see Patent Document 1).

In addition, there has also been proposed a heating device in which heat is transferred to the internal cell structure, by disposing a tubular resistance-heating type heater so as to surround the circumferential wall of the honeycomb structure and by heating the wall surface of the circumferential wall of the honeycomb structure, (see Patent Document 2).

CITATION LIST

Patent Documents

[Patent Document 1] JP-A-2010-229976
[Patent Document 2] JP-A-2013-238116

SUMMARY OF THE INVENTION

Problem to be Solved by the Invention

However, in the system in which the honeycomb structure itself is caused to generate heat by energization, even when only a slight crack occurs in the honeycomb structure due to vibration or the like, the route of the current flowing in the honeycomb structure changes and a temperature drop and change of temperature distribution occur, and thus the durability cannot be said to be sufficient. In addition, in this system, the honeycomb structure is used in a state where a heat-insulation material (holding material) is wound around the circumference of the honeycomb structure which is housed in a tubular metal case, but when the heat-insulation material absorbs moisture (water absorption), an electric leakage or a short circuit may occur at the time of energizing the honeycomb structure. That is, since the water vapor remaining in the exhaust system after the engine is shut off is condensed in the exhaust system, when there is a water absorbing member such as a heat-insulation material in the exhaust system, moisture generated by condensation tends to collect on the water absorbing member (heat-insulation material). Then, when the heat-insulation material absorbs such moisture, the electrical insulation property of the heat-insulation material decreases, and as a result, a leakage/short circuit accident may occur due to the heat-insulation material having absorbed water.

On the other hand, in a system in which a tubular resistance-heating type heater is arranged so as to surround the circumferential wall of the honeycomb structure, the honeycomb structure is heated by an external heater, and even when a slight crack is generated in the honeycomb structure due to vibration or the like, the temperature change of the honeycomb structure is small. However, the tubular heater tends to be damaged by thermal stress. And, in heating by a single (integral structure) resistance-heating type heater, when the heater is broken and cannot be energized, the entire honeycomb structure is not heated at all.

As means for solving such problems, arranging a plurality of resistance-heating type heaters so as to surround the circumferential wall of the honeycomb structure can be considered. In this case, for energizing a plurality of heaters collectively, a connecting body for electrically connecting the plurality of heaters is required. Usually, this type of heating device is used in a state where the honeycomb structure and the heaters are housed in a tubular metal case, and the temperature inside the metal case is about 500 to 1000° C. when the heaters generate heat. Therefore, in the case of connecting the heaters inside the metal case, in order to prevent melting of the connecting body, a connecting body which has a large heat capacity to some extent and difficulty of raising its temperature is needed. However, when the heat capacity is increased by increasing the cross-sectional area for example, the rigidity of the connecting body is increased accordingly. When a connecting body having high rigidity is used as the connecting body, the honeycomb structure is strongly restrained by the connecting body and the plurality of heaters connected by the connecting body. For this reason, when the honeycomb structure is heated by the heater and thermally expanded, high stress is applied to the honeycomb structure from the connecting body and the plurality of heaters connected by the connecting body, and as a result, breakage of the honeycomb structure occurs.

On the other hand, when a connecting body having low rigidity is used for the connecting body, the binding force between the heaters given by the connecting body is weakened, and thus, the stress as described above can be relaxed and breakage of the honeycomb structure due to the stress can be prevented. However, since such a low-rigidity connecting body is usually small in heat capacity, the connecting body is easily melted by the heat of the heater inside the metal case which is a high-temperature environment.

The present invention has been made in view of such circumstances. That is, an object of the present invention is to provide a honeycomb type heating device in which breakage or melting of a honeycomb structure (honeycomb substrate) hardly occurs and a method for using the same, even when connection between a plurality of heaters surrounding the circumferential wall of the honeycomb substrate is made inside a metal case.

Means for Solving the Problem

In order to achieve the above object, the following honeycomb type heating device and a method for using the same are provided according to the present invention.

[1] A honeycomb type heating device including: a pillar-shaped honeycomb substrate including: a partition wall defining and forming a plurality of cells extending from one end face to the other end face; and a circumferential wall surrounding the partition wall; a plurality of heaters arranged adjacent to each other on a circumferential surface that is an outer surface of the circumferential wall in a circumferential direction of the circumferential surface; a connecting body arranged in the circumferential direction of the circumferential surface and electrically connecting the plurality of heaters to each other; and a metal case housing the honeycomb substrate, the plurality of heaters, and the connecting body, wherein each of the heaters is a resistance-heating type heater which generates heat by energization, a sectional area of the connecting body in a cross section perpendicular to the circumferential direction of the circumferential surface is 10.0 to 30.0 mm$^2$, and a thermal expansion coefficient of the connecting body is larger than a thermal expansion coefficient of the honeycomb substrate by $3.0 \times 10^{-6}$/° C. or more.

[2] The honeycomb type heating device according to [1], wherein the connecting body is provided with a stress relaxing portion.

[3] The honeycomb type heating device according to [2], wherein the stress relaxing portion is a notch formed on the connecting body.

[4] The honeycomb type heating device according to [2], wherein the stress relaxing portion is a bent portion formed on the connecting body.

[5] The honeycomb type heating device according to any one of [1] to [4], wherein the connecting body is a metal plate.

[6] The honeycomb type heating device according to any one of [1] to [5], wherein the connecting body is made of any one kind of metallic material selected from a group of Ni, Ni-based alloys and stainless steels.

[7] The honeycomb type heating device according to any one of [1] to [6], wherein the honeycomb substrate is made of a ceramic material having a thermal conductivity of 20 W/m·K or more.

[8] The honeycomb type heating device according to any one of [1] to [7], wherein the plurality of heaters are electrically connected in series or in parallel and have electric resistance which allows an application of a high voltage of 200 V or more.

[9] The honeycomb type heating device according to any one of [1] to [8], wherein each of the heaters has an insulating function of preventing an electric current flowing from each of the heaters to the honeycomb substrate.

[10] The honeycomb type heating device according to any one of [1] to [9], wherein a central angle of each of the heaters arranged on the circumferential surface of the honeycomb substrate is 180° or less in a cross section perpendicular to a longitudinal direction of the honeycomb substrate.

[11] The honeycomb type heating device according to any one of [1] to [10], wherein a thickness of the circumferential wall is greater than a thickness of the partition wall.

[12] The honeycomb type heating device according to any one of [1] to [11], wherein a stress relief is formed on the honeycomb substrate.

[13] The honeycomb type heating device according to any one of [1] to [12], wherein a catalyst for purifying exhaust gas is loaded onto the honeycomb substrate.

[14] A method for using a honeycomb type heating device, including: installing the honeycomb type heating device according to [13] in an exhaust path of exhaust gas discharged from an engine; and allowing each of the heaters to generate heat by starting to energize each of the heaters before starting the engine so that a temperature of the honeycomb substrate loaded with the catalyst for purifying exhaust gas rises to a temperature equal to or higher than a catalytic activation temperature of the catalyst.

Effect of the Invention

In the honeycomb type heating device of the present invention, the cross-sectional area of the connecting body is set in the range of 10.0 to 30.0 mm$^2$. As a result, the connecting body can be prevented from melting in a high temperature environment such as the inside of the metal case. In addition, since the rigidity of the connecting body does not become too high, the binding force to the honeycomb substrate caused by the connecting body and the plurality of heaters connected by the connecting body can be reduced. As a result, when the honeycomb substrate is heated by the heater and thermally expanded, the stress applied to the honeycomb substrate from the connecting body and the plurality of heaters connected by the connecting body is relaxed, and the honeycomb substrate can be prevented from breaking due to the stress. Further, in the honeycomb type heating device of the present invention, the thermal expansion coefficient of the connecting body is set to be higher than the thermal expansion coefficient of the honeycomb substrate by $3.0 \times 10^{-6}$/° C. or more. Thereby, when the honeycomb substrate is heated by the heater and thermally expanded, the connecting body thermally expands more than the honeycomb substrate. As a result, when the honeycomb substrate is heated by the heater and thermally expanded, the stress applied to the honeycomb substrate from the connecting body and the plurality of heaters connected by the connecting body is relaxed, and the honeycomb substrate can be prevented from breaking due to the stress.

In addition, according to the method for using the honeycomb type heating device of the present invention, each heater is caused to generate heat by starting the energization to each heater before starting the engine, and the temperature of the honeycomb substrate loaded with the catalyst for purifying exhaust gas can be raised to a temperature equal to or higher than the catalyst activation temperature of the catalyst. As a result, the harmful components contained in the exhaust gas can be efficiently purified by the activated catalyst immediately after the engine is started.

MODE FOR CARRYING OUT THE INVENTION

Hereinafter, the present invention will be described based on specific embodiments; however, the present invention is not interpreted as being limited to these embodiments, and without departing from the spirit of the present invention, modifications and improvements of design can be added as appropriate based on common knowledge of a person skilled in the art.

Figure 1:
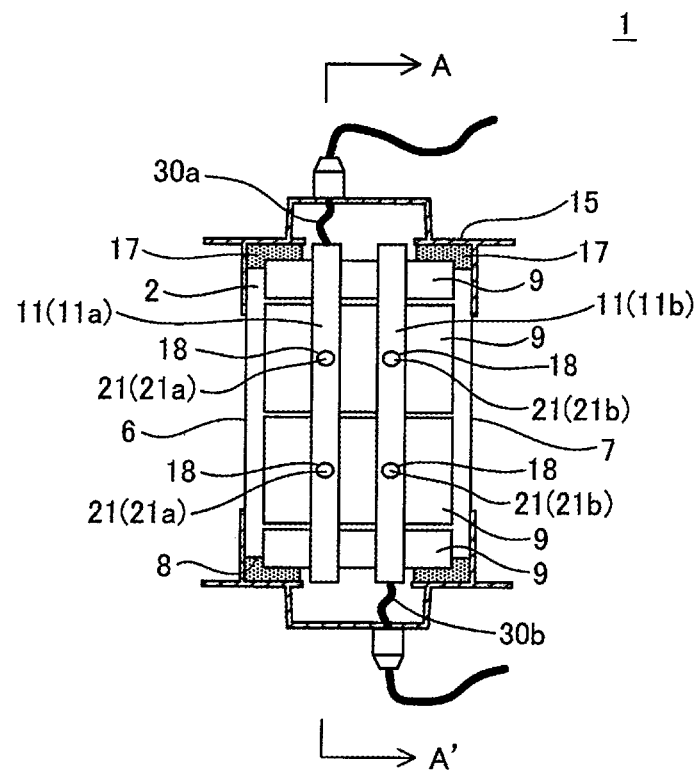
FIG. 1 is a schematic explanatory view showing an example of an embodiment of a honeycomb type heating device of the present invention and showing an internal structure of a metal case as viewed from a direction perpendicular to the longitudinal direction of the honeycomb substrate.
Figure 2:
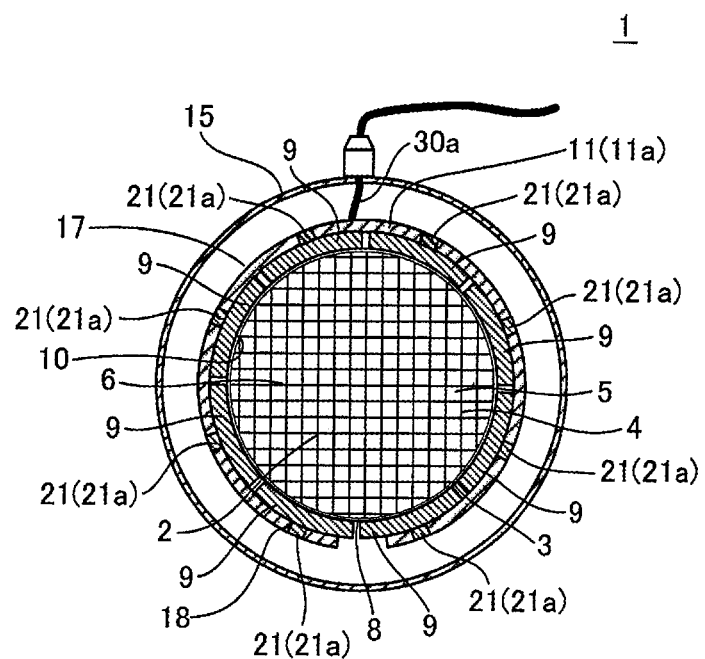
FIG. 2 is a cross-sectional view taken along line A-A' in FIG. 1.

(1) Honeycomb Type Heating Device:

FIG. 1 is a schematic explanatory view showing an example of an embodiment of the honeycomb type heating device of the present invention, and showing an internal structure of a metal case as viewed from a direction perpendicular to the longitudinal direction of the honeycomb substrate. FIG. 2 is a cross-sectional view taken along line A-A' in FIG. 1. As shown in FIGS. 1 and 2, a honeycomb type heating device 1 of the present invention includes a honeycomb substrate 2, a plurality of heaters 9, a connecting body 11, and a metal case 15.

The honeycomb substrate 2 is pillar-shaped, and has a partition wall 4 that defines and forms a plurality of cells 5 extending from one end face 6 to the other end face 7, and an circumferential wall 3 that surrounds the partition wall 4. The cell 5 serves as a flow path for a fluid such as an exhaust gas. The plurality of heaters 9 are arranged adjacent to each other on a circumferential surface 8 which is the outer surface (the surface exposed to the outside) of the circumferential wall 3 of the honeycomb substrate 2 in the circumferential direction of the circumferential surface 8. Each heater 9 is a resistance-heating type heater having an electrode 21 for energization and generating heat by the energization. The plurality of heaters 9 are electrically connected by the connecting body 11. In the present embodiment, as shown in FIG. 1, two connecting bodies 11a and 11b are provided. The one connecting body 11a of these two connecting bodies is connected to an anode side electrode 21a of each heater 9 and the other connecting body 11b is connected to a cathode side electrode 21b of each heater 9. Ends of electric wires 30a and 30b are electrically connected to these two connecting bodies 11a and 11b, respectively. The other ends of the electric wires 30a and 30b are drawn to the outside of the metal case 15 and connected to a power source. Each of heaters 9 can be operated to generate heat by being energized by these electric wires 30a and 30b through the connecting bodies 11a and 11b from the power source.

The metal case 15 is a tubular metal structure that houses the honeycomb substrate 2, the plurality of heaters 9, and the connecting body 11. The connecting body 11 is disposed along the circumferential surface 8 of the honeycomb substrate 2 and is electrically connected to the electrode 21 of each heater 9 inside the metal case 15.

In the honeycomb type heating device 1 of the present invention, the cross-sectional area of the connecting body 11 in a cross section perpendicular to the circumferential direction of the circumferential surface 8 of the honeycomb substrate 2 (hereinafter sometimes simply referred to as "cross-sectional area of the connecting body") is 10.0 to 30.0 mm². As shown in FIG. 1, in the case where the honeycomb type heating device 1 has a plurality of connecting bodies 11, the respective cross-sectional areas of the individual connecting bodies 11 need to be included in the range. By setting the cross-sectional area of the connecting body 11 to 10.0 mm² or more, the connecting body 11 can be provided with an appropriate heat capacity. Therefore, excessive temperature rise of the connecting body 11 is suppressed, and melting of the connecting body 11 can be effectively prevented under a high temperature environment inside the metal case 15. Further, by setting the cross-sectional area of the connecting body 11 to 30.0 mm² or less, the rigidity of the connecting body 11 can be prevented from being too high. Therefore, the binding force to the honeycomb substrate 2 by the connecting body 11 and the plurality of heaters 9 connected by the connecting body 11 can be reduced. As a result, when the honeycomb substrate 2 is heated by the heater 9 and thermally expanded, the stress applied to the honeycomb substrate 2 from the connecting body 11 and the plurality of heaters 9 connected by the connecting body 11 is relaxed, and breakage of the honeycomb substrate 2 due to the stress can be effectively prevented. In the honeycomb type heating device 1 of the present invention, the cross-sectional area of the connecting body 11 is preferably 20 to 30 mm², and further preferably 20 to 25 mm².

Further, in the honeycomb type heating device 1 of the present invention, the thermal expansion coefficient of the connecting body 11 is set to be higher than the thermal expansion coefficient of the honeycomb substrate 2 by $3.0 \times 10^{-6}/°$ C. or more. Thereby, when the honeycomb substrate 2 is heated by the heater 9 and thermally expanded, the connecting body 11 thermally expands more than the honeycomb substrate 2. As a result, when the honeycomb substrate 2 is heated by the heater 9 and thermally expanded, the stress applied to the honeycomb substrate 2 from the connecting body 11 and the plurality of heaters 9 connected by the connecting body 11 is relaxed, and breakage of the honeycomb substrate 2 due to the stress can be effectively prevented. In the honeycomb type heating device 1 of the present invention, the thermal expansion coefficient of the connecting body 11 is preferably larger than the thermal expansion coefficient of the honeycomb substrate 2 by $6.0 \times 10^{-6}/°$ C. or more, and further preferably larger by $12.0 \times 10^{-6}/°$ C. or more. In the present invention, the thermal expansion coefficients of the connecting body and the honeycomb substrate are values obtained by measuring the dimensional change from the room temperature to 800° C. using a linear expansion coefficient measuring apparatus (thermomechanical analyzer (TMA)).

Further, in the honeycomb type heating device 1 of the present invention, since the honeycomb substrate 2 is heated by the plurality of heaters 9, even when some of the heaters 9 are damaged and no longer generate heat, the remaining workable heaters 9 can heat the honeycomb substrate 2.

Furthermore, the plurality of heaters 9 used in the honeycomb type heating device 1 of the present invention are adjacent to each other in the circumferential direction of the circumferential surface 8 of the honeycomb substrate 2, but are separated from each other, and thus a large thermal stress hardly occurs in each heater 9. Therefore, the plurality of heaters 9 are less liable to be damaged by thermal stress, and are superior in durability, as compared with a tubular single heater as disclosed in Patent Document 2.

The number of the heaters 9 used in the honeycomb type heating device 1 of the present invention has only to be two or more, and the upper limit number is not particularly restricted, but, the number is preferably set to about two to eight in consideration of easy assembly of the device or the like. In the case of using a honeycomb substrate having a curved circumferential surface (for example, a round pillar-shaped honeycomb substrate), it is preferable that a concave arcuate surface 10 curved to the same extent as the circumferential surface 8 of the honeycomb substrate 2 is formed on the heater 9 as shown in FIG. 2 and the like. The concave arcuate surface 10 is a surface facing the circumferential surface 8 of the honeycomb substrate 2. By forming such a surface 10, when the heater 9 is disposed on the circumferential surface 8 of the honeycomb substrate 2, a gap is hardly formed between the heater 9 and the circumferential surface 8, so that the heat of the heater 9 is efficiently transmitted to the honeycomb substrate 2.

Further, the honeycomb type heating device 1 of the present invention preferably has a portion where 50% or more of the circumferential surface 8 is covered with the heater 9 in the circumferential direction of the honeycomb substrate 2. Furthermore, in the honeycomb type heating device 1 of the present invention, the "portion where 50% or more of the circumferential surface 8 is covered with the heater 9 in the circumferential direction of the honeycomb substrate 2" preferably extends over a length of 60% or more of the entire length of the honeycomb substrate 2 in the longitudinal direction of the honeycomb substrate 2. By setting the region covered with the heater 9 on the circumferential surface 8 of the honeycomb substrate 2 in this way, the temperature of the honeycomb substrate 2 can be easily raised to a target temperature.

Ordinarily, when the honeycomb type heating device 1 of the present invention is mounted to be used on an automobile, a power source used for the electric system of the automobile is also used for energizing the heater 9 commonly, and the power source with a high voltage such as 200 V is used. Therefore, in the honeycomb type heating device 1 of the present invention, the plurality of heaters 9 are electrically connected in series or in parallel and preferably have an electric resistance capable of allowing a high voltage of 200 V or more to be applied. Here, "capable of allowing a high voltage of 200 V or more to be applied" specifically means that a current of about 25 A can flow when 200 V is applied.

Incidentally, since a metallic heater has low electric resistance, excessive current flows when such a high voltage power source is used, which may damage the power source circuit. Therefore, in the honeycomb type heating device 1 of the present invention, a ceramic heater in which a heat generating resistor is embedded in the ceramic member is preferably used. Beryllia, aluminum nitride, silicon nitride, alumina, and the like can be suitably used as the constituent material of the ceramic member. As a constituent material of the heat generating resistor, silver (Ag), aluminum (Al), gold (Au), beryllium (Be), copper (Cu), magnesium (Mg), molybdenum (Mo), tungsten (W), ruthenium (Ru), platinum (Pt) and the like can be suitably used. In addition, the heat generating resistor may be made of a compound, and in this case, a nitride, carbide, boride, silicide, or the like of zirconium (Zr), titanium (Ti), niobium (Nb), hafnium (Hf), tantalum (Ta), molybdenum (Mo), tungsten (W) can be suitably used.

Figure 3:
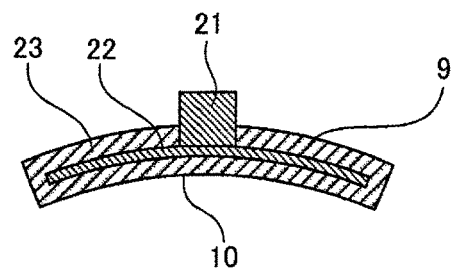
FIG. 3 is a schematic cross-sectional view showing an example of a heater used in the honeycomb type heating device of the present invention.

FIG. 3 is a schematic cross-sectional view showing an example of the heater used in the honeycomb type heating device of the present invention. This heater 9 is a ceramic heater in which a heat generating resistor 22 is embedded inside a ceramic member 23. On the heat generating resistor 22, the electrode 21 for energizing the heater 9 (heat generating resistor 22) is erected. The electrode 21 may be made of the same material as the heat generating resistor 22 or a different material.

In the case where the honeycomb substrate 2 used for the honeycomb type heating device 1 of the present invention is formed of a conductive material, each heater 9 preferably has an insulating function of preventing a current from flowing from each heater 9 to the honeycomb substrate 2. When each of the heaters 9 has the insulating function, even in the case where the honeycomb substrate 2 is formed of a conductive material, current can be prevented from flowing from each heater 9 to the honeycomb substrate and causing a short circuit. As an example of a method for giving the insulating function to each heater 9, it is possible to cite, for example, a method which arranges a layered insulating material on a surface of each of the heaters 9, which faces the circumferential surface 8 of the honeycomb substrate 2. As a material of the insulating material, silicon nitride, alumina, or the like can be suitably used.

Figure 7:
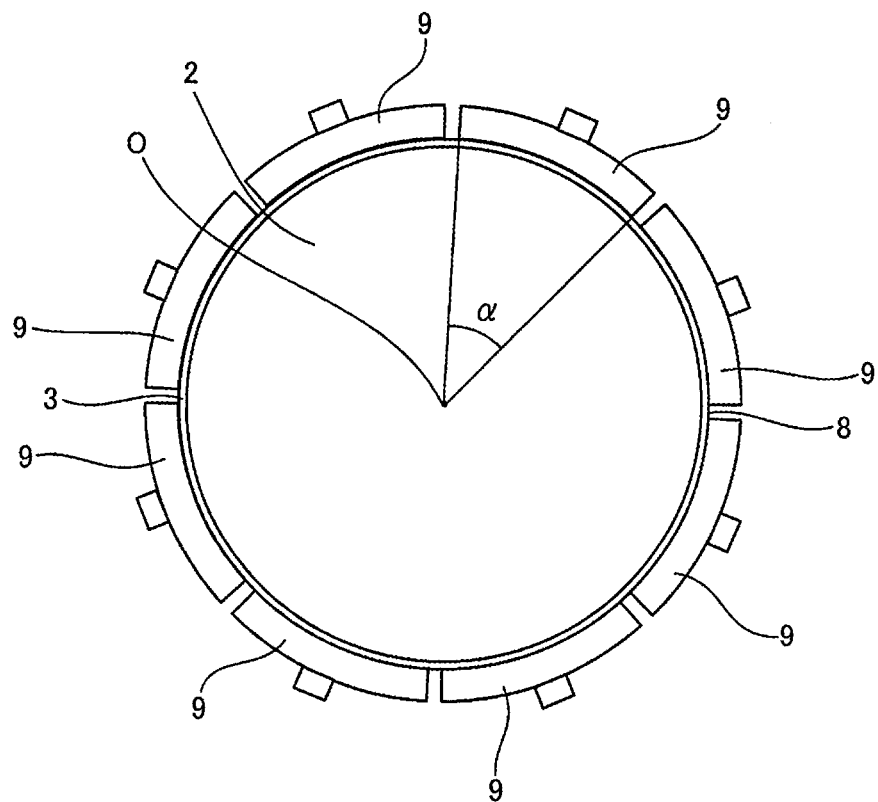
FIG. 7 is a schematic cross-sectional view for describing a central angle of a heater.

In the honeycomb type heating device 1 of the present invention, on the cross section perpendicular to the longitudinal direction (axial direction) of the honeycomb substrate 2, a central angle α of each of the heaters 9 arranged on the circumferential surface 8 of the honeycomb substrate 2 is preferably 180° or less. In addition, the central angle α is further preferably 10 to 180°, and still further preferably 10 to 100°. Here, "the central angle a of each heater 9" means the angle formed by the two line segments each connecting each of both ends of each heater 9 and a center O of the honeycomb substrate 2 in a cross section perpendicular to the longitudinal direction of the honeycomb substrate 2, as shown in FIG. 7. In addition, "a center O of the honeycomb substrate 2" means the center of the circle when the circumferential shape in the cross section perpendicular to the longitudinal direction of the honeycomb substrate 2 is circular as shown in FIG. 7. When the circumferential shape of the cross section perpendicular to the longitudinal direction of the honeycomb substrate 2 is a shape other than a circular shape, the center O means the center of the largest circle contained inside the shape in the cross section. When the central angle α of each heater 9 exceeds 180°, a gap tends to be formed between the honeycomb substrate 2 and the heater 9. When the central angle α of each heater 9 is less than 10°, the range on the circumferential surface 8 that can be covered with one heater 9 becomes small, and the number of the heaters 9 necessary for heating the honeycomb substrate 2 to a target temperature may sometimes become too large. In FIG. 7, the partition wall of the honeycomb substrate 2 is omitted.

The material and form of the connecting body 11 used in the honeycomb type heating device 1 of the present invention is not particularly limited, as long as the connecting body 11 is a conductor having a cross-sectional area of 10.0 to 30.0 mm$^2$ and an thermal expansion coefficient higher than that of the honeycomb substrate 2 by $3.0 \times 10^{-6}$/° C. or more. As a material that can be suitably used as the connecting body 11, a metal plate can be cited for example. When a metal plate is used as the connecting body 11, the metal plate is preferably used in a state of being bent so as to surround the plurality of heaters 9 like the connecting body 11 in FIG. 2. Further like the connecting body 11 in FIG. 2, the metal plate is provided with a hole 18 into which the electrode 21 of the heater 9 is fitted, and the metal plate (connecting body 11) is preferably connected to the electrode 21 on the heater 9 electrically in the hole 18.

Figure 4:
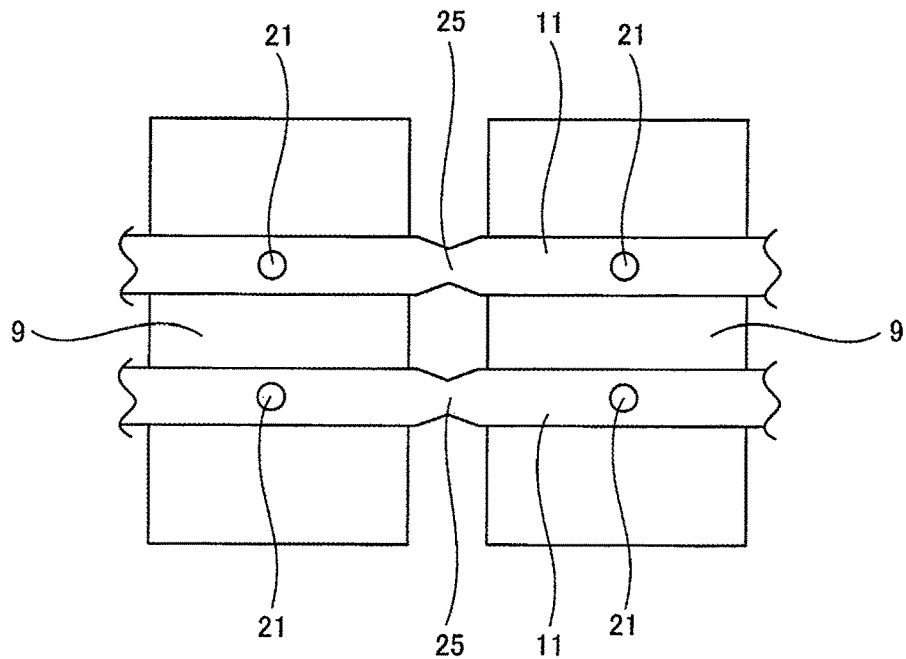
FIG. 4 is a schematic plane view showing an example of a stress relaxing portion.
Figure 5:
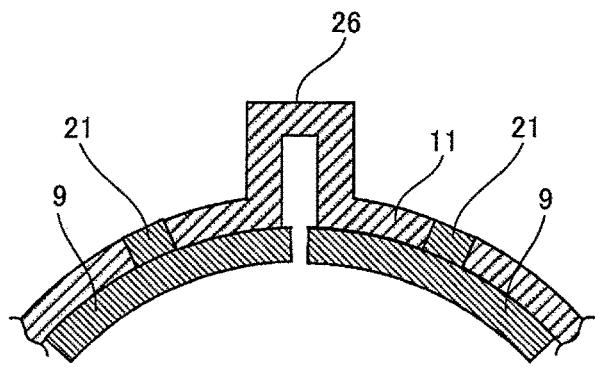
FIG. 5 is a schematic cross-sectional view showing another example of the stress relaxing portion.

Further, in the honeycomb type heating device 1 of the present invention, it is preferable that stress relaxing portions for relaxing stress are provided on the connecting body 11. The term "stress relaxing portion" as referred to herein means a portion which has a function of lowering the binding force produced by the connecting body between the heaters and of relaxing the stress applied to the honeycomb substrate from the connecting body and the plurality of heaters connected by the connecting body when the honeycomb substrate is heated by the heater and thermally expanded. FIG. 4 is a schematic side view showing an example of the stress relaxing portion (a schematic view seen from a direction perpendicular to the longitudinal direction of the honeycomb substrate). In this example, a notch is formed in the connecting body 11 between the electrodes 21 of the adjacent heaters 9, and the portion where this notch is formed is a stress relaxing portion 25. Since the portion where the notch is formed has lower rigidity and easily deforms compared to other portions, it is possible to reduce the binding force by the connecting body 11 between the heaters 9 and to relax the stress. FIG. 5 is a schematic cross-sectional view (a schematic view of a cross section perpendicular to the longitudinal direction of the honeycomb substrate) showing another example of the stress relaxing portion. In this example, a bent portion is formed on the connecting body 11 between the electrodes 21 of the adjacent heaters 9, and this bent portion is used as a stress relaxing portion 26. Since such a bent portion has elasticity, it is possible to reduce the binding force by the connecting body 11 between the heaters 9 and to relax the stress.

In the honeycomb type heating device 1 of the present invention, the melting temperature of the connecting body 11 is preferably 1100° C. or more, further preferably 1300° C. or more, and particularly 1500° C. or more. As described above, by using the connecting body 11 having a high melting temperature, it becomes difficult for the connecting body 11 to be melted. The material of the connecting body 11 is not particularly limited, but it is preferable to use any one kind of metallic material selected from the group of nickel (Ni), Ni-based alloys and stainless steels because they have high heat resistance and low electric resistance. A nickel-coated copper wire formed by coating a copper wire with nickel may be preferably used as the conductor.

The honeycomb substrate 2 used in the honeycomb type heating device 1 of the present invention is preferably composed of a ceramic material having a thermal conductivity of 20 W/m·K or more, and further preferably composed of a ceramic material having a thermal conductivity of 50 W/m·K or more. Since the honeycomb substrate 2 is made of such a material having high thermal conductivity, heat of the heater 9 can be efficiently transferred to the honeycomb substrate 2, and the entire honeycomb substrate 2 can be caused to uniformly generate heat. In the present invention, the thermal conductivity of the honeycomb substrate is a value measured by a laser flash method.

As a constituent material of the honeycomb substrate 2, one having SiC (silicon carbide) as a main component, which is excellent in thermal conductivity, heat resistance and corrosion resistance is preferable. Incidentally, the term "main component" used herein means a component occupying 50 mass % or more of the entire material. More specific constituent materials are Si—SiC composite, (Si+Al)—SiC composite, metal composite SiC, recrystallized SiC, $Si_3N_4$, SiC, and the like cited as a suitable material. However, when the porosity of the honeycomb substrate 2 is too high, a high thermal conductivity sometimes cannot be obtained even by using these materials. Thus, the honeycomb substrate 2 is preferably a compact substance (porosity is about 0-5%). The Si—SiC composite material is densely formed by impregnating metallic Si into SiC, and exhibits high thermal conductivity and heat resistance, and thus, is particularly preferable as a constituent material of the honeycomb substrate 2.

The thickness of the circumferential wall 3 of the honeycomb substrate 2 is preferably greater than the thickness of the partition wall 4. By the thickness of the circumferential wall 3 greater than the thickness of the partition wall 4 as described above, the strength of the honeycomb substrate 2 can be increased, and the strength required for the honeycomb substrate 2 can be easily ensured.

The thickness of the circumferential wall 3 of the honeycomb substrate 2 is not particularly limited but is preferably 0.15 to 2.0 mm, further preferably 0.3 to 1.0 mm. By setting the thickness of the circumferential wall 3 to 0.15 mm or more, the mechanical strength of the honeycomb substrate 2 becomes sufficient to prevent damage of the honeycomb substrate 2 due to impact and thermal stress. Further, by setting the thickness of the circumferential wall 3 to 2.0 mm or less, the heat of the heater 9 can be efficiently transmitted to the partition wall 4 via the circumferential wall 3.

The thickness of the partition wall 4 of the honeycomb substrate 2 is also not particularly limited, but is preferably 0.1 to 1 mm, and further preferably 0.2 to 0.5 mm. By setting the thickness of the partition wall 4 to 0.1 mm or more, the mechanical strength of the honeycomb substrate 2 becomes sufficient to prevent damage of the honeycomb substrate 2 due to impact and thermal stress. Further, by setting the thickness of the partition wall 4 to 1 mm or less, the pressure loss when the fluid flows in the cell 5 can be prevented from increasing.

The cell density (the number of cells per unit cross-sectional area) of the honeycomb substrate 2 is not particularly limited, but preferably in the range of 25 to 2000 cells/square inch (4 to 320 cells/cm$^2$). By setting the cell density to 25 cells/square inch (4 cells/cm$^2$) or more, the strength of the partition wall 4 and also the strength of the honeycomb substrate 2 itself and effective geometric surface area (GSA) of the honeycomb substrate 2 itself become sufficient. Further, by setting the cell density to 2000 cells/square inch (320 cells/cm$^2$) or less, the pressure loss when the fluid flows through the cell 5 can be prevented from increasing.

The porosity of the honeycomb substrate 2 is further preferably about 0 to 5%. By setting the porosity of the honeycomb substrate 2 in such a range, the strength necessary for the honeycomb substrate 2 can be easily secured and the thermal conductivity can be improved. The "porosity" referred to as herein is a value measured by the Archimedes method.

The shape (outer shape) of the honeycomb substrate 2 is not particularly limited except that the shape is a pillar-shape, and may be, for example, a round pillar-shape, an elliptic pillar-shape, a polygonal pillar-shape, or the like. The shape of the cell 5 on a cross section perpendicular to the longitudinal direction of the honeycomb substrate 2 of the cell 5 (hereinafter referred to as "cell shape") is also not particularly limited, but is preferably a polygon such as a quadrangle, a hexagon, an octagon, or alternatively a combination of these shapes such as a combination of a quadrangle and an octagon for example.

The diameter of the honeycomb substrate 2 in a cross section perpendicular to the longitudinal direction of the honeycomb substrate 2 (in the case where the cross section is a shape other than a circle, the diameter of a circle circumscribing the cross section) is not particularly limited, but is preferably 300 mm or less and further preferably 200 mm or less. By setting the diameter of the honeycomb substrate 2 in the cross section perpendicular to the longitudinal direction of the honeycomb substrate 2 within such a range, the heat of the heater 9 can be efficiently transferred to the partition wall 4 inside the honeycomb substrate 2.

Figure 6:
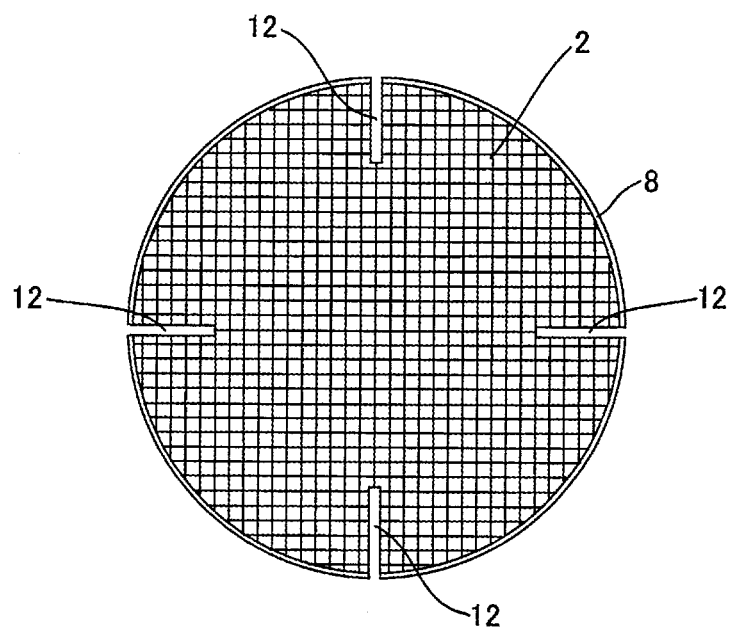
FIG. 6 is a schematic plane view showing an example of a honeycomb substrate on which a stress relief is formed.

A stress relief is preferably formed on the honeycomb substrate 2. By forming the stress relief, stress relaxation within the honeycomb substrate 2 becomes possible. As a representative example of the stress relief, there is a slit 12 formed by cutting inward from the circumferential surface 8 of the honeycomb substrate 2 as shown in FIG. 6, for example. However, the stress relief is not limited to such a slit 12, and a publicly known stress relief can be formed without departing from the present invention.

When the honeycomb type heating device 1 of the present invention is installed and used in an exhaust path for exhaust gas discharged from an engine, the partition wall 4 of the honeycomb substrate 2 is preferably loaded with a catalyst for purifying the exhaust gas. By thus loading the catalyst onto the partition wall 4, harmful substances such as CO, NOx, HC or the like in the exhaust gas can be converted into harmless substances by catalytic reaction. Here, the type of the catalyst to be loaded onto the partition wall 4 of the honeycomb substrate 2 is not particularly limited, but when the catalyst is used for purifying automobile exhaust gas, for example, it is preferable to use a noble metal. The noble metal is preferably platinum, rhodium or palladium, or a combination of these metals. The amount of these noble metals to be loaded per unit volume of the honeycomb substrate 2 is preferably 0.1 to 5 g/L.

In order to load the noble metal or the like in a highly dispersed state onto the partition wall 4, it is preferable that the catalyst is temporarily loaded onto particles (carrier particulates) of a heat-resistant inorganic oxide having a large specific surface area such as alumina particles, and then loaded onto the partition wall 4 of the honeycomb substrate 2 together with the particles.

In the honeycomb type heating device 1 of the present invention, the material of the metal case 15 is preferably stainless steel for example, and preferably chromium-based or chromium-nickel-based stainless steel in particular.

Further, in the honeycomb type heating device 1 of the present invention, it is preferable to dispose a heat-insulation material 17 between the honeycomb substrate 2 and the metal case 15 at positions close to one end face 6 and the other end face 7 of the honeycomb substrate 2, respectively, as shown in FIG. 1. By disposing the heat-insulation material 17 in this manner, the heat of the heater 9 hardly escapes to the outside, and the heat of the heater 9 can be efficiently transmitted to the honeycomb substrate 2. The material of the heat-insulation material 17 is not particularly limited, but the ceramic fiber mat is preferably used because the mat can be easily disposed between the honeycomb substrate 2 and the metal case 15 by being wrapped around the circumference of the honeycomb substrate 2 and because its heat-insulation property is also high. The connecting body 11 and the electrode 21 are preferably configured not to be in contact with the heat-insulation material 17. With such a structure, even when the heat-insulation material 17 absorbs water and the electrical insulation property of the heat-insulation material 17 decreases, accidents caused by an electric leakage and a short circuit are less likely to occur. Further, it is desirable to provide a heat-insulation sheet having heat resistance between the connecting body 11 as well as the electrode 21 and the heat-insulation material 17. As the heat-insulation sheet having heat resistance, a sheet made of a mica material or the like is preferable.

The application and usage form of the honeycomb type heating device 1 of the present invention is not particularly limited, but the heating device 1 is preferably installed in an exhaust path of exhaust gas discharged from an engine from the viewpoint of effectively making use of the effect. In that case, the honeycomb type heating device 1 of the present invention is preferably used so that the energization of each of the heaters 9 is initiated before the engine is started and each heater 9 generates heat to raise the temperature of the honeycomb substrate 2 loaded with a catalyst for purifying the exhaust gas to a temperature equal to or higher than the catalytic activation temperature of the catalyst. When the honeycomb type heating device 1 of the present invention is used in this manner, harmful components contained in the exhaust gas can be efficiently purified by the activated catalyst immediately after the engine is started.

(2) Manufacturing Method of Honeycomb Type Heating Device:

An example of the manufacturing method of the honeycomb type heating device of the present invention will be described. In order to produce a honeycomb substrate, first, a forming raw material containing a ceramic raw material is prepared. For the ceramic raw material, a powder capable of forming the ceramics exemplified above as a material of the honeycomb substrate can be suitably used. For example, when a Si-SiC composite material is adopted as the constituent material of the honeycomb substrate, it is preferable to use SiC powder as the ceramic raw material. It is preferable that the forming raw material is prepared by mixing such a ceramic raw material with additives such as a dispersing medium, an organic binder, an inorganic binder, and a surfactant, as necessary.

Next, the forming raw material is kneaded to form a pillar-shaped kneaded material. There is no particular limitation on the method of kneading the forming raw material to form a kneaded material. As a preferable method, a method using a kneader, a vacuum pugmill or the like can be cited for example.

Next, a honeycomb formed body having a partition wall and a circumferential wall is extruded from the kneaded material using a die having a lattice-shaped slit, and this honeycomb formed body is dried. The drying method is not particularly limited. As suitable drying methods, methods of hot air drying, microwave drying, dielectric drying, reduced pressure drying, vacuum drying, freeze drying and the like can be cited for example. Among these methods, methods of dielectric drying, microwave drying and hot air drying are preferably carried out alone or in combination.

Subsequently, the dried honeycomb formed body (honeycomb dried body) is fired to produce a honeycomb substrate. Incidentally, in order to remove the binder and the like contained in the honeycomb formed body, calcination (degreasing) is preferably performed before this firing (main firing). The conditions for the calcination are not particularly limited, and any condition may be employed as long as the organic matter (organic binder or the like) contained in the honeycomb formed body can be removed (burnt). Since the conditions (temperature, time, atmosphere, and others) for firing (main firing) of the honeycomb formed body differ depending on the kind of the forming raw material, appropriate conditions may be selected according to the kind. For example, when producing a honeycomb substrate composed of a Si—SiC composite material, lump metal Si is placed on a honeycomb formed body containing SiC powder and fired in a reduced pressure inert gas or a vacuum, and the honeycomb formed body is impregnated with metal Si. By this firing, a dense (low porosity) honeycomb substrate in which metal Si fills the gaps between SiC particles is obtained. A stress relief such as a slit may be formed on the honeycomb substrate as necessary.

When a catalyst for purifying exhaust gas is loaded onto the partition wall of the honeycomb substrate, catalyst-coated particulates are obtained by drying and firing a ceramic powder that will become carrier particulates after being impregnated in advance with an aqueous solution containing a catalyst component such as a noble metal, for example. Coating liquid (slurry) is prepared by adding a dispersing medium (water, or the like) and other additives to the catalyst-coated particulates thus obtained. Then, the partition wall of the honeycomb substrate is coated with this slurry by a conventionally known coating method such as a suction method, and then dried and fired to load the partition wall of the honeycomb substrate with the catalyst.

Next, a heater is manufactured. The manufacturing method described below is an example of a method for manufacturing a ceramic heater which is one type of resistance-heating type heater. First, a sintering assistant, a binder, or the like are appropriately added to a ceramic raw material such as aluminum nitride, silicon nitride, and alumina to obtain a forming raw material for a heater. A plate formed body curved to the same extent as the circumferential surface of the honeycomb substrate is prepared from this forming raw material for a heater and fired to produce a ceramic plate. The surface of the ceramic plate is printed with a heat generating resistor and then fired again. As the heat generating resistor, silver (Ag), aluminum (Al), gold (Au), beryllium (Be), copper (Cu), magnesium (Mg), molybdenum (Mo), tungsten (W), ruthenium (Ru), platinum (Pt) or the like can be suitably used. The heat generating resistor may be made of a compound, and in this case, a heat generating resistor made of nitride, carbide, boride, silicide and the like of zirconium (Zr), titanium (Ti), niobium (Nb), hafnium (Hf), tantalum (Ta), molybdenum (Mo), and tungsten (W) can be suitably used.

Next, a rod-shaped electrode is erected on the heat generating resistor so as to be electrically connected to the heat generating resistor. Subsequently, a hole for inserting an electrode is provided in a ceramic plate manufactured by the same method as the abovementioned ceramic plate, and this ceramic plate is superposed on and bonded to the ceramic plate on which the heat generating resistor is printed. In this way, a ceramic heater having a concave arcuate surface curved to the same extent as the circumferential surface of the honeycomb substrate can be obtained.

The plurality of ceramic heaters thus obtained are arranged adjacent to each other along the circumferential direction of the circumferential surface of the honeycomb substrate so as to surround the circumferential surface and the concave arcuate surface of each ceramic heater is brought into contact with the circumferential surface of the honeycomb substrate. Subsequently, a connecting body (for example, a metal plate) having a cross-sectional area of 10.0 to 30.0 mm$^2$ and having a thermal expansion coefficient higher than the thermal expansion coefficient of the honeycomb substrate by $3.0 \times 10^{-6}$/° C. or more is arranged in the circumferential direction of the circumferential surface of the honeycomb substrate, and electrically connected to an electrode of each heater. Next, a ceramic fiber mat (heat-insulation material) is wrapped around the circumference of the honeycomb substrate at portions close to one end face and the other end face of the honeycomb substrate, and the honeycomb substrate is housed in the metal case. Incidentally, it is preferable that one end of an electric wire for energizing the heater from an external power source via the connecting body is connected to the connecting body, and the other end of the electric wire is pulled out to the outside of the metal case.

As described above, the honeycomb type heating device of the present invention, which can be installed in an exhaust path of exhaust gas discharged from an engine or the like, is obtained.

(3) Usage of Honeycomb Type Heating Device:

The honeycomb type heating device used in the method for using a honeycomb type heating device of the present invention is the abovementioned honeycomb type heating device 1 of the present invention in which a catalyst for purifying exhaust gas is loaded onto a honeycomb substrate. In this usage, the honeycomb type heating device 1 having a catalyst for purifying exhaust gas loaded onto a honeycomb substrate is installed in an exhaust path of exhaust gas discharged from an engine. Then, before starting the engine, energization to each heater 9 is started to allow each heater 9 to generate heat so that the honeycomb substrate 2 loaded with the catalyst for purifying exhaust gas is heated to raise its temperature to a temperature equal to or higher than the catalytic activation temperature of the catalyst. According to this usage, harmful components contained in the exhaust gas can be efficiently purified by the activated catalyst immediately after the engine is started.

EXAMPLES

Hereinafter, the present invention will be described in more detail based on examples, but is not limited to these examples.

Example 1

A binder and water were added to SiC powder to prepare a forming raw material for a honeycomb substrate, which was then kneaded in a vacuum pugmill to obtain a round pillar-shaped kneaded material. From this kneaded material, a round pillar-shaped honeycomb formed body was obtained by extrusion, which had a partition wall for defining and forming a plurality of cells extending from one end face to the other end face and a circumferential wall surrounding the partition wall. Thereafter, the honeycomb formed body was dried with microwave and hot air to obtain a honeycomb dried body. Next, lump metal Si was placed on the honeycomb dried body and fired in a vacuum furnace to obtain a honeycomb substrate composed of a Si-SiC composite material. The honeycomb substrate obtained in this way had a round pillar-shape with a diameter of 90 mm and a length of 75 mm, the area of the circumferential surface was 21,195 mm$^2$, the thickness of the circumferential wall was 0.3 mm, the thickness of the partition wall was 0.15 mm, the cell shape was a square, and the cell density was 400 cells/cm$^2$. Also, the porosity of the honeycomb substrate was 5%.

Next, a binder and water were added to the $Si_3N_4$ powder to prepare a forming raw material for a heater. A plate formed body curved to the same extent as the circumferential surface of the honeycomb substrate was prepared from this forming raw material for a heater and fired to produce a ceramic plate. A heat generating resistor made of platinum was printed on the surface of this ceramic plate and then the ceramic plate was fired again. Next, a rod-shaped electrode was erected on the heat generating resistor so as to be electrically connected to the heat generating resistor. Subsequently, a ceramic plate manufactured by the same method as the abovementioned ceramic plate was provided with a hole for inserting the electrode, and bonded to the ceramic plate on which the heat generating resistor had been printed. In this manner, a ceramic heater having a concave arcuate surface curved to the same extent as the circumferential surface of the honeycomb substrate was obtained. The concave arcuate surface of this heater had a width (the length of the circular arc) of 10 mm and a length (a length in the direction perpendicular to the circular arc) of 65 mm.

Subsequently, the eight heaters obtained as described above were arranged adjacent to each other on the circumferential surface of the honeycomb substrate in the circumferential direction of the circumferential surface, and the concave arcuate surface of each heater was brought into contact with the circumferential surface of the honeycomb substrate. At this time, in the circumferential direction of the circumferential surface of the honeycomb substrate, the arrangement of the heaters was adjusted so that the intervals between adjacent heaters were all equal. Subsequently, a metal plate made of SUS 430 having a cross-sectional area of 27.0 mm$^2$ and a thermal expansion coefficient larger than the thermal expansion coefficient of the honeycomb substrate by $10.5 \times 10^{-6}/°$ C. was bent, and arranged in the circumferential direction of the circumferential surface of the honeycomb substrate, being electrically connected with the electrode of each heater. The metal plate was previously provided with holes to be fitted with the electrodes of the respective heaters and electrically connected to the electrodes of the respective heaters at the holes. Next, an alumina fiber mat (heat-insulation material) was wound around the circumference of the honeycomb substrate at the portions each close to one end face and the other end face of the honeycomb substrate, and the honeycomb substrate was housed in a cylindrical metal case. It should be noted that one end of an electric wire for energizing the heater from an external power source via the connecting body was connected to the connecting body beforehand and the other end of the electric wire was pulled out to the outside of the metal case. The honeycomb type heating device of Example 1 was obtained as described above.

(Evaluation)

Application of 7.5 W of electric power for 40 seconds as one cycle to each of the ten honeycomb type heating devices obtained as described above was repeated ten times. Thereafter, the number of honeycomb type heating devices whose honeycomb substrates were broken was examined, and the result is shown in Table 1.

Example 2

A honeycomb type heating device of Example 2 was obtained in the same manner as in Example 1 except that the thermal expansion coefficient of the metal plate was changed to be larger than the thermal expansion coefficient of the honeycomb substrate by $3.6 \times 10^{-6}/°$ C. by changing the material of the metal plate to invar. With respect to the ten honeycomb type heating devices thus obtained, the number of honeycomb type heating devices whose honeycomb substrates were broken was examined in the same manner as in Example 1, and the result is shown in Table 1.

Example 3

The honeycomb type heating device of Example 3 was obtained in the same manner as in Example 1 except that the cross-sectional area of the metal plate was changed to 20.0 mm$^2$ and the thermal expansion coefficient of the metal plate was changed to be larger than the thermal expansion coefficient of the honeycomb substrate by $15.7 \times 10^{-6}/°$ C. by changing the material of the metal plate to SUS 304. With respect to the ten honeycomb type heating devices thus obtained, the number of honeycomb type heating devices whose honeycomb substrates were broken was examined in the same manner as in Example 1, and the result is shown in Table 1.

Comparative Example 1

A honeycomb type heating device of Comparative Example 1 was obtained in the same manner as in Example 1 except that the thermal expansion coefficient of the cable was changed to be larger than the thermal expansion coefficient of the honeycomb substrate by $1.3 \times 10^{-6}/°$ C. by using a tungsten cable having a cross-sectional area of 38.5 mm$^2$ instead of the metal plate. With respect to the ten honeycomb type heating devices thus obtained, the number of honeycomb type heating devices whose honeycomb substrates were broken was examined in the same manner as in Example 1, and the result is shown in Table 1.

Comparative Example 2

A honeycomb type heating device of Comparative Example 2 was obtained in the same manner as in Comparative Example 1 except that the thermal expansion coefficient of the cable was changed to be larger than the thermal expansion coefficient of the honeycomb substrate by $10.5 \times 10^{-6}/°$ C. by using a cable made of SUS 430 instead of the tungsten cable. With respect to the ten honeycomb type heating devices thus obtained, the number of honeycomb type heating devices whose honeycomb substrates were broken was examined in the same manner as in Example 1, and the result is shown in Table 1.

Comparative Example 3

A honeycomb type heating device of Comparative Example 3 was obtained in the same manner as in Comparative Example 1 except that the cross sectional area of the tungsten cable was changed to 33.0 mm$^2$. With respect to the ten honeycomb type heating devices thus obtained, the number of honeycomb type heating devices whose honeycomb substrates were broken was examined in the same manner as in Example 1, and the result is shown in Table 1.

TABLE 1

|  | Cross-sectional area of connecting body (mm$^2$) *1 | Difference of thermal expansion coefficient (/° C.) *2 | Number of broken honeycomb substrates (pieces) *3 |
|---|---|---|---|
| Example 1 | 27.0 | $10.5 \times 10^{-6}$ | 1 |
| Example 2 | 27.0 | $3.6 \times 10^{-6}$ | 2 |
| Example 3 | 20.0 | $15.7 \times 10^{-6}$ | 0 |
| Comparative Example 1 | 38.5 | $1.3 \times 10^{-6}$ | 9 |
| Comparative Example 2 | 38.5 | $10.5 \times 10^{-6}$ | 8 |
| Comparative Example 3 | 33.0 | $1.3 \times 10^{-6}$ | 7 |

*1 Cross-sectional area of the connecting body (a metal plate or a cable) in a cross section perpendicular to the circumferential direction of the circumferential surface of the honeycomb substrate.
*2 Value obtained by subtracting the thermal expansion coefficient of the honeycomb substrate from the thermal expansion coefficient of the connecting body (a metal plate or a cable)
*3 Number of honeycomb type heating devices whose honeycomb substrates were broken among ten honeycomb type heating devices (Consideration)

As shown in Table 1, in Examples 1 to 3 in which the cross-sectional area of the connecting body was 10.0 to 30.0 mm$^2$ and the difference in thermal expansion coefficient between the connecting body and the honeycomb substrate was $3.0 \times 10^{-6}$/° C. or more, the number of the honeycomb type heating devices whose honeycomb substrates were broken was two or less out of ten. On the other hand, in Comparative Examples 1 and 3 in which the cross-sectional area of the connecting body exceeded 30.0 mm$^2$ and the difference in thermal expansion coefficient was less than $3.0 \times 10^{-6}$/° C., and in Comparative Example 2 in which the cross-sectional area of the connecting body exceeded 30.0 mm$^2$, the number of the honeycomb type heating devices whose honeycomb substrates were broken was seven or more out of ten.

INDUSTRIAL APPLICABILITY

The present invention can be used suitably as a honeycomb type heating device installed in an exhaust path of exhaust gas discharged from an engine of an automobile or the like and quickly raising the temperature of the catalyst for purifying exhaust gas to its activation temperature, and as a method for using the same.

DESCRIPTION OF REFERENCE NUMERALS

1: honeycomb type heating device
2: honeycomb substrate
3: circumferential wall
4: partition wall
5: cell
6: one end face
7: other end face
8: circumferential surface
9: heater
10: concave arcuate surface (surface facing the circumferential surface of a honeycomb substrate)
11: connecting body
11a: connecting body
11b: connecting body
12: slit
15: metal case
17: heat-insulation material
18: hole
21: electrode
21a: electrode
21b: electrode
22: heat generating resistor
23: ceramic member
25: stress relaxing portion
26: stress relaxing portion
30a: electric wire
30b: electric wire
O: center
α: central angle

What is claimed is:

1. A honeycomb type heating device comprising:
   a pillar-shaped honeycomb substrate including a partition wall defining and forming a plurality of cells extending from one end face to the other end face, and a circumferential wall surrounding the partition wall;
   a plurality of heaters arranged adjacent to each other on a circumferential surface that is an outer surface of the circumferential wall in a circumferential direction of the circumferential surface;
   a connecting body arranged in the circumferential direction of the circumferential surface and electrically connecting the plurality of heaters to each other; and
   a metal case housing the honeycomb substrate, the plurality of heaters, and the connecting body,
   wherein each of the heaters is a resistance-heating type heater which generates heat by energization,
   a sectional area of the connecting body in a cross section perpendicular to the circumferential direction of the circumferential surface is 10.0 to 30.0 mm2, and
   a thermal expansion coefficient of the connecting body is larger than a thermal expansion coefficient of the honeycomb substrate by $3.0 \times 10$-6/° C. or more.

2. The honeycomb type heating device according to claim 1, wherein the connecting body is provided with a stress relaxing portion.

3. The honeycomb type heating device according to claim 2, wherein the stress relaxing portion is a notch formed on the connecting body.

4. The honeycomb type heating device according to claim 2, wherein the stress relaxing portion is a bent portion formed on the connecting body.

5. The honeycomb type heating device according to claim 1, wherein the connecting body is a metal plate.

6. The honeycomb type heating device according to claim 3, wherein the connecting body is a metal plate.

7. The honeycomb type heating device according to claim 4, wherein the connecting body is a metal plate.

8. The honeycomb type heating device according to claim 1, wherein the connecting body is made of any one kind of metallic material selected from a group of Ni, Ni-based alloys and stainless steels.

9. The honeycomb type heating device according to claim 6, wherein the connecting body is made of any one kind of metallic material selected from a group of Ni, Ni-based alloys and stainless steels.

10. The honeycomb type heating device according to claim 7, wherein the connecting body is made of any one kind of metallic material selected from a group of Ni, Ni-based alloys and stainless steels.

11. The honeycomb type heating device according to claim 1, wherein the honeycomb substrate is made of a ceramic material having a thermal conductivity of 20 W/m·K or more.

12. The honeycomb type heating device according to claim 1, wherein the plurality of heaters are electrically connected in series or in parallel and have electric resistance which allows an application of a high voltage of 200 V or more.

13. The honeycomb type heating device according to claim 1, wherein each of the heaters has an insulating function of preventing an electric current flowing from each of the heaters to the honeycomb substrate.

14. The honeycomb type heating device according to claim 1, wherein a central angle of each of the heaters arranged on the circumferential surface of the honeycomb substrate is 180° or less in a cross section perpendicular to a longitudinal direction of the honeycomb substrate.

15. The honeycomb type heating device according to claim 1, wherein a thickness of the circumferential wall is greater than a thickness of the partition wall.

16. The honeycomb type heating device according to claim 1, wherein a stress relief is formed on the honeycomb substrate.

17. The honeycomb type heating device according to claim 1, wherein a catalyst for purifying exhaust gas is loaded onto the honeycomb substrate.

18. A method for using a honeycomb type heating device, comprising:
- installing the honeycomb type heating device according to claim 17 in an exhaust path of exhaust gas discharged from an engine; and
- allowing each of the heaters to generate heat by starting to energize each of the heaters before starting the engine so that a temperature of the honeycomb substrate loaded with the catalyst for purifying exhaust gas rises to a temperature equal to or higher than a catalytic activation temperature of the catalyst.

* * * * *